US005784609A

United States Patent [19]
Kurihara

[11] Patent Number: 5,784,609
[45] Date of Patent: Jul. 21, 1998

[54] SYSTEM FOR REMOTELY AUTHENTICATING ACCESS TO LOCAL SOFTWARE

[75] Inventor: Akira Kurihara, Tokyo, Japan

[73] Assignee: Sony Corporation, Tokyo, Japan

[21] Appl. No.: 499,452

[22] Filed: Jul. 7, 1995

[30] Foreign Application Priority Data

Jul. 8, 1994 [JP] Japan .................. 6-156863

[51] Int. Cl.$^6$ .................................. H04L 9/32
[52] U.S. Cl. ............. 395/609; 395/186; 395/187.01; 395/490; 395/491; 364/286.5; 364/282.1
[58] Field of Search ................. 395/712, 609, 395/186, 187.01, 188.01, 490–491; 380/3–4, 23, 25

[56] References Cited

U.S. PATENT DOCUMENTS

| | | | |
|---|---|---|---|
| 4,652,990 | 3/1987 | Pailen et al. | 380/4 |
| 4,654,792 | 3/1987 | Thomas | 395/188.01 |
| 4,845,715 | 7/1989 | Francisco | 395/186 |
| 5,023,907 | 6/1991 | Johnson et al. | 380/4 |
| 5,204,897 | 4/1993 | Wyman | 380/4 |
| 5,260,999 | 11/1993 | Wyman | 380/4 |
| 5,291,598 | 3/1994 | Grundy | 395/680 |
| 5,375,240 | 12/1994 | Grundy | 395/186 |
| 5,504,893 | 4/1996 | Kawashima et al. | 395/609 |
| 5,542,072 | 7/1996 | Kawashima et al. | 395/610 |
| 5,560,008 | 9/1996 | Johnson et al. | 395/680 |

*Primary Examiner*—Lance Leonard Barry
*Attorney, Agent, or Firm*—Frommer Lawrence & Haug LLP; William S. Frommer

[57] ABSTRACT

A system for offering a large amount of information such as images and musics safely, accurately, effectively and at low cost is provided. In the system, a CD-ROM 42 is offered from an information offerer to an user. An user ID is transmitted from the user to the information offerer through a communication interface section 36. When the user ID is determined to be an ID of a legitimate user by the information offerer, access authorizing information which authorizes the user to access to and read information in the CD-ROM 42 is transmitted from the information offerer to the user. Thereby, a CD-ROM reader 31 can read the predetermined information from the CD-ROM 42.

15 Claims, 6 Drawing Sheets

SYSTEM FOR REMOTELY AUTHENTICATING ACCESS TO LOCAL SOFTWARE

BACKGROUND OF THE INVENTION

1. Field of the Invention

The present invention relates to an information offering system for offering a large amount of information such as images and sound.

2. Description of Related Art

A conventional information offering system has been offering information from an information offerer to users by transmitting information from a database system of the information offerer to an information processing terminal equipment such as a personal computer of the user by using a telephone line and the like.

Another conventional information offering system has been offering information from an information offerer to users by broadcasting information from a database system to an information processing terminal equipment of the user by using a satellite or the like.

Still another information offering system has been offering information to users by selling recording media such as a CD-ROM in which information to be offered to the user is recorded and by handing a key for decoding a cryptograph of the data over phone.

Although the conventional information offering system which transmits information by using a telephone line has no problem when a amount of information to be transmitted is relatively small like text data, the line cost increases due to limitation on the transmission rate and the like of the telephone line when data such as images and sound whose information amount is enormous is to be transmitted.

Further, when information is offered to the users through broadcasting, there has been a problem in terms of security such as information management because the flow of information is unilateral and the information sent to the users through broadcasting may be freely utilized.

When the recording medium in which information to be offered is recorded is sold, there has been a problem that a service has to be provided every day of the year and it is actually hard to realize because the key for decoding cryptograph of the data is handed to the user directly over the phone.

Accordingly, it is an object of the present invention to solve the aforementioned problems by realizing an information offering system which can offer information having an enormous amount of data such as images and sound to a large number of users efficiently at low cost.

SUMMARY OF THE INVENTION

In an information offering system of the present invention there are a center (e.g. a center 1 in FIGS. 1 and 2) for offering information and a user terminal (e.g. a terminal 2 in FIGS. 1 and 3) which receives the offer of information from the center, the user terminal comprises information storage means (e.g. a CD-ROM 42 in FIG. 3) for storing chargeable information offered from the center to the user terminal, first transmitting means (e.g. a communication interface section 36 in FIG. 3) for transmitting a request signal for requesting the center to transmit access authorizing information for authorizing access to the chargeable information from the information storage means and a user ID for identifying a user of the user terminal by a first communication method, and first control means (e.g. Step 107 on a program shown in FIG. 4) for reading the chargeable information which is authorized to be read in response to the access authorizing information transmitted from the center, and the center comprises means (e.g. a communication interface section 18 in FIG. 2) for receiving the request signal and the user ID transmitted from the user terminal, determining means (e.g. Step 207 on the program shown in FIG. 5) for determining whether the user who corresponds to the user ID is a legitimate user or not, and second transmitting means (e.g. the communication interface section 18 in FIG. 2) for transmitting the access authorizing information to the user terminal when the user is determined to be a legitimate user by the determining means.

In the system, the second transmitting means of the center transmits the access authorizing information by the first communication method.

The center further comprises third transmitting means (e.g. the communication interface section 18 in FIG. 2) for transmitting the chargeable information to the user by a second communication method.

The information storage means is a CD-ROM distributed from the information offerer to the user in advance and contains a plural types of chargeable information.

The first transmitting means transmits to the center an information ID for identifying chargeable information requested by the user, and the second transmitting means transmits to the user terminal access authorizing information which corresponds to the information ID.

The user terminal further comprises first access key storage means (e.g. a storage device 40 in FIG. 3) for storing the access authorizing information, and the first control means reads the access authorizing information for accessing the chargeable information which corresponds to the information ID in the first access key storage means.

The first control means also generates the request signal when no access authorizing information which corresponds to the information ID exists in the first access key storage means.

The center further comprises second access key storage means (e.g. storage devices 11 and 12 in FIG. 2) for storing access authorizing information of the plural types of chargeable information in correspondence with the information ID and second control means (e.g. a CPU 13 in FIG. 2) for reading the access authorizing information which corresponds to the information ID transmitted from the user terminal from the second access key storage means.

The first communication method is a communication method using a communication network and the second communication method is a communication method using a broadcasting network. The communication rate of the communication network and that of the broadcasting network are asymmetrical.

The second transmitting means uses the broadcasting network in transmitting the access authorizing information to all of the users and uses the communication network in transmitting the access authorizing information to the individual user.

The center further comprises first accounting information storage means (e.g. the storage device 12 in FIG. 2) for storing accounting information per information of the chargeable information in correspondence with the information ID, second accounting information storage means (e.g. the storage device 12 in FIG. 2) for storing accounting information per individual user in correspondence with the user ID, accounting information updating means (e.g. Step 210 on the program in FIG. 5) for updating the accounting information per user in the second accounting information storage means by reading accounting information which corresponds with the pertinent information ID from the first accounting information storage means when the access authorizing information is transmitted to the user terminal.

An effective period is set up for the access authorizing information stored in the first access key storage means and the first control means inhibits access to the chargeable information when the effective period has expired.

The first control means generates the request signal for requesting the pertinent access authorizing information to be transmitted when the effective period of the access authorizing information of chargeable information desired by the user has expired.

The information storage means for storing the chargeable information contains information concerning how to make contact with the information offerer.

The information concerning how to contact the information offerer is recorded in correspondence with the chargeable information.

The first transmitting means transmits the request signal and the user ID to the contact destination of the information offerer.

In the information offering system of the present invention constructed as described above, the CD-ROM 42 is offered from the information offerer to the user and the user identifier is transmitted from the user to the information offerer through the communication interface section 36. When the user is determined to be a legitimate user from the user identifier, access authorizing information which authorizes the user to access and read information in the CD-ROM 42 is transmitted from the information offerer to the user via the communication interface section 18. Accordingly, the present invention can realize a system for offering a large amount of data efficiently at low cost.

The above and other advantages of the present invention will become more apparent in the following description and the accompanying drawings.

DESCRIPTION OF PREFERRED EMBODIMENT

Figure 1:
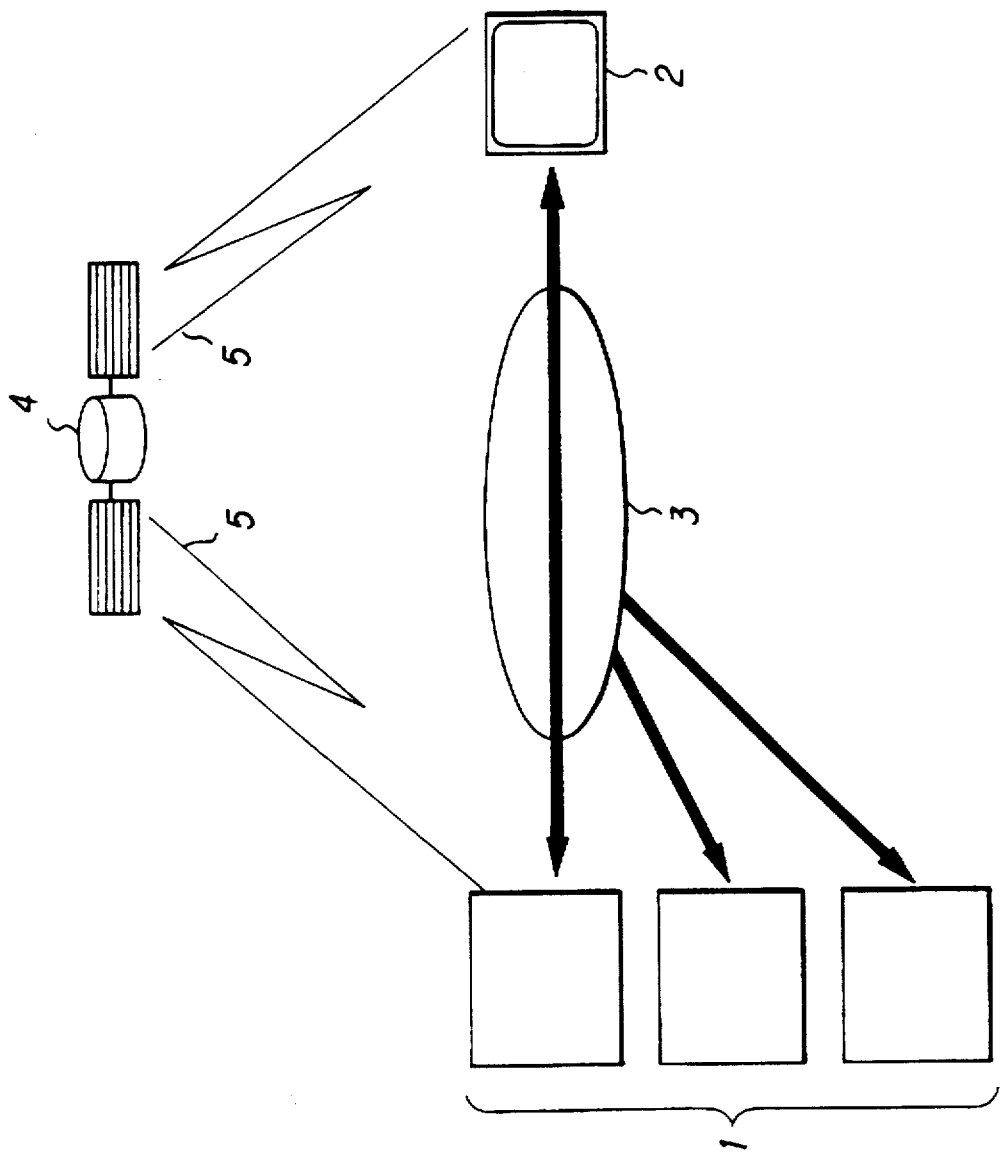
FIG. 1 is a system structural drawing showing one preferred embodiment of an overall flow of information in an information offering system of the present invention.
Figure 2:
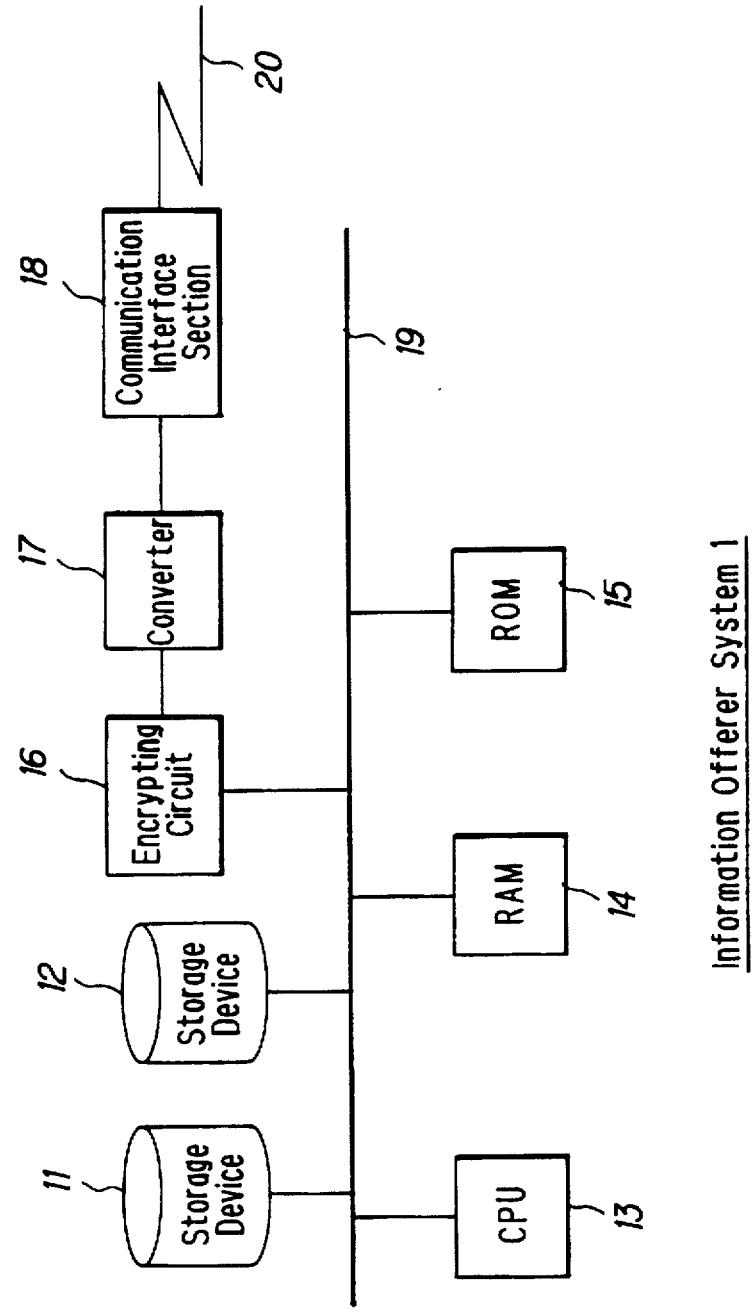
FIG. 2 is a block diagram illustrating one embodiment of a concrete structure of an information offering equipment in the information offering system of the present invention.
Figure 3:
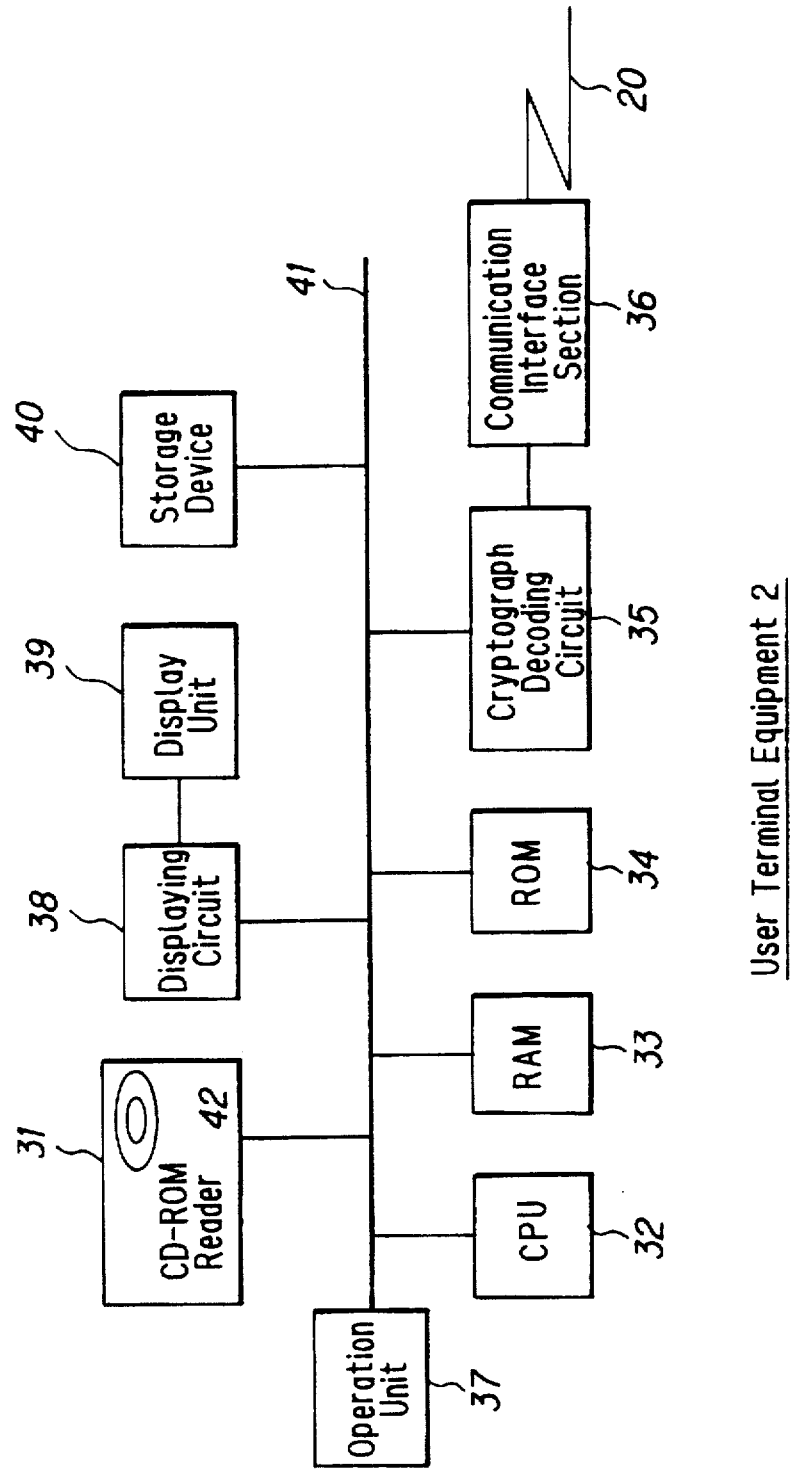
FIG. 3 is a block diagram illustrating one embodiment of a concrete structure of an user terminal equipment in the information offering system of the present invention.

A preferred embodiment of the present invention will be explained below on the basis of FIGS. 1 through 3. FIG. 1 is a system structural drawing illustrating an overall flow of information in an information offering system of the present invention. In the figure, an information offering equipment 1 is a system with which an information offerer offers information to users and is constructed as shown in FIG. 2 for example. User terminal equipment 2 can extract the information from the information offerer and is constructed as shown in FIG. 3 for example.

The information offering equipment (center) 1 and the user terminal equipment 2 are connected by a communication network 3 such as a telephone line and ISDN so as to be able to transmit information bi-directionally and are also arranged so that information can be transmitted from the information offering equipment 1 to the user terminal equipment 2 with a broadcasting network 5 through the intermediary of a satellite 4. While the information is exchanged between the information offering equipment 1 and the user terminal equipment 2 through the communication network 3 and broadcasting network 5, a communication rate of the communication network 3 and that of the broadcasting network 5 are set to be asymmetrical (different rates).

In FIG. 2, a storage device 11 is a device for storing accounting information, updating history information and user's telephone number, etc. per each user. A storage device 12 is a device for storing access authorizing key for authorizing each user to read information from a recording medium such as a CD-ROM and an access authorization fee of each information item offered by the information offerer.

An encrypting circuit 16 performs an encrypting process on the information sent from the information offering equipment 1 in accordance with a method such as scramble DES, FEAL or RSA. A converter 17 converts the encrypted information into predetermined signals suited for transmission. A communication interface section 18 is an interface connected with the communication network 3 or the broadcasting network 5. A transmission system 20 refers to the communication network 3 or the broadcasting network 5.

A ROM 15 is a memory for storing a control program for running the information offering equipment 1 and management information of the information offering equipment 1 (e.g. information for managing capacity of storage devices 11 and 12 and a relationship of connections between each block). A RAM 14 is a memory for storing information representing the present status (e.g. information showing a result of a program in the middle of its operation). A CPU 13 executes the control program. A system bus 19 comprises a data bus, address bus and control bus connecting each system element.

In FIG. 3, a CD-ROM reader 31 reads information recorded in a CD-ROM 42. A storage device 40 is a device for storing the access authorizing key for the CD-ROM 42. A cryptograph decoding circuit 35 performs a cryptograph decoding process on the information transmitted from the information offering equipment 1. A communication interface section 36 is an interface connected with the communication network 3 or the broadcasting network 5.

A RAM 33 is a memory for storing directory information and others of the CD-ROM 42. A ROM 34 is a memory for storing a control program and management information of the user terminal equipment 2. A CPU 32 executes the control program.

A displaying circuit 38 performs a signal processing on the information so as to be able to display it on a display unit 39 such as a TV monitor. An operation unit 37 is operated by the user to perform such operations as to select information to be displayed on the display unit 39. A system bus 41 comprises a data bus, address bus and control bus connecting each system element.

Figure 4:
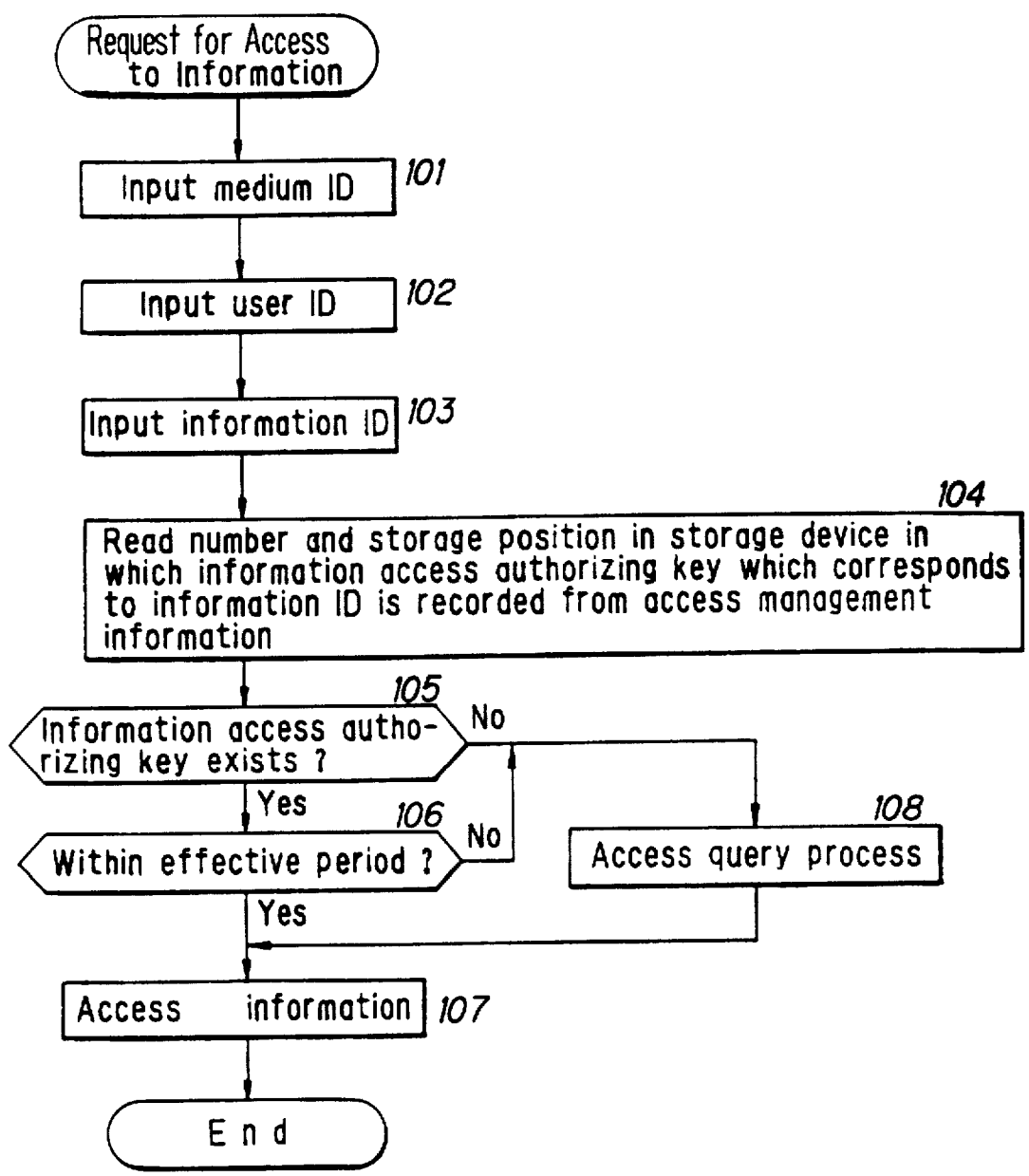
FIG. 4 is a flowchart explaining one embodiment of a flow of operations of the user terminal equipment in the information offering system of the present invention.

The system operation will be explained below based on the arrangement described above and with reference to flowcharts shown in FIGS. 4 and 5. A case when ISDN is used as the communication network of the information offering system according to the present invention will be explained below.

The information offerer distributes CD-ROMs 42, in which an enormous amount of information such as images and sound are recorded, to the users through a certain distribution channel. It is possible to make an arrangement in which the information offerer sends information such as images and sound to the users via the broadcasting network 5 and the users store such information in the storage device 40 and the like in advance. It is also possible to distribute the CD-ROMs 42 at first and to send update information and additional information for the information in the CD-ROM via the broadcasting network 5. In any case, the user cannot access the information without the access authorizing key. Here, its price is set to be free or to be sufficiently low when it is charged (its substantial fee is charged through an accounting process described later).

The user sets the CD-ROM 42 in the CD-ROM reader 31 and operates the operation unit 37 to request access to desired information among the information recorded in the CD-ROM 42. In accessing to the information in the CD-ROM 42, the user can retrieve, read or execute the desired information by a tree structure information management mechanism from a table of contents of information for example.

When the access is requested through the operation of the operation unit 37, the CPU 32 runs the control program stored in the ROM 34. FIG. 4 shows a flow of processes of this control program. Note that this control program is designed assuming that the user of one terminal may not be one person, i.e. assuming a case when a whole family member is the user for example.

At first, the user inputs a medium identifier (medium ID) of the CD-ROM 42 in which information to be accessed is recorded by operating the operation unit 37. Or, it is possible to cause the CD-ROM reader 31 to automatically read the medium ID when the CD-ROM 42 is inserted in the reader 31 (Step 101).

Next, the user inputs a user identifier (user ID) identifying oneself by operating the operation unit 37 (Step 102). In the same manner, the user inputs an information identifier (information ID) which corresponds to the information to be accessed (Step 103). The information ID is generated when desired information is selected from a menu listing contents of the information. Note that the information ID itself is not displayed: it is generated in correspondence with the selected information content. Those IDs are stored in the RAM 33.

When such IDs are input, the CPU 32 reads an area (or a number of a storage device when a plurality of storage devices exist) and a storage position in the storage device in which an information access authorizing key which corresponds to the information ID of the input medium ID is recorded from the access management information of the input user ID stored in the storage device 40 (Step 104).

Then, the CPU 32 determines from the read result whether the information access authorizing key exists or not (Step 105) and determines, when the key exists, whether it is within an effective period or not (Step 106). When the information access authorizing key within the effective period exists, the CPU 32 executes a process for accessing the information which corresponds to the input information ID. That is, it controls the CD-ROM reader 31 to read the information which corresponds to the input information ID from the CD-ROM 42 and outputs and displays the information on the display unit 39 via the displaying circuit 38 (Step 107).

When no information access authorizing key is registered in the storage device 40 or when its effective period has expired even if it has been registered, an access query process is executed (Step 108). When an information access authorizing key within the effective period is obtained as a result of the access query process, the process for accessing the information is executed (Step 107).

Figure 5:
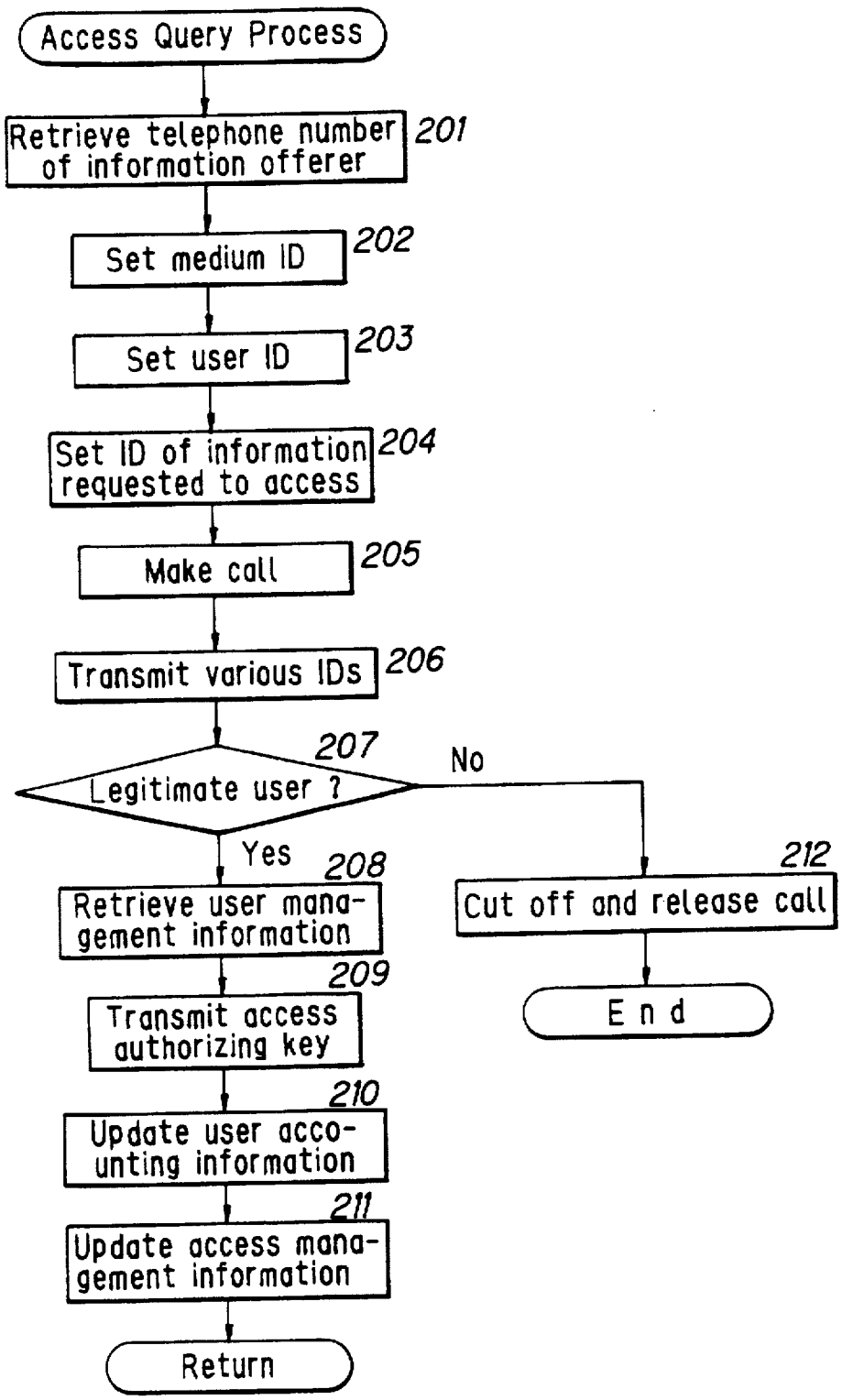
FIG. 5 is a flowchart explaining one embodiment of a flow of operations of Step 108 in FIG. 4.

FIG. 5 shows the access query process in detail.

In FIG. 5, the CPU 32 causes the CD-ROM reader 31 to read a telephone number of the information offerer of the pertinent information recorded in the CD-ROM 42 and stores it in the RAM 33 (Step 201). Then, the CPU 32 prepares the medium ID, user ID and information ID stored in the RAM 33 as data to be transmitted to the information offerer (Steps 202 through 204).

Note that the telephone number of the information offerer is not always only one. When it is necessary to query a plurality of information offerers, telephone numbers of the plurality of information offerers recorded in the CD-ROM 42 are read and stored in the RAM 33.

A call is made to the information offerer via the communication interface section 36 based on the telephone number of the information offerer stored in the RAM 33 (Step 205). When the line between the user terminal equipment 2 and the information offering equipment 1 is connected, the CPU 32 adds the medium ID, user ID and information ID stored in the RAM 33 to user information (which is information defined by an ISDN format) in a call setting message and transmits that information to the information offering equipment 1 via the transmission system 20 comprising the communication interface section 36 and the communication network 3 (Step 206).

The information offering equipment 1 receives the ID information via the communication interface section 18. The CPU 13 determines whether the user ID is an ID of a legitimate user or not by retrieving a position of the information which corresponds to the user ID among such received ID information within the user management information stored in the storage device 12 (Step 207). When the received user ID is determined to be not an ID of a legitimate user, the line between the user terminal equipment 2 and the information offering equipment 1 is cut off and is released (Step 212) to end the process. That is, the user cannot access the requested information in this case.

Note that the legitimate user here is a user who has notified the center as being a purchaser of the CD-ROM 42 and who has been steadily paying a fee which corresponds to the past accounting. Users in arrears with their fees cannot access the information because they are not registered as the legitimate users.

When the received user ID is determined to be an ID of a legitimate user, the user management information is retrieved to extract an access authorizing key which is accounting information and access authorizing information which corresponds to the user ID, medium ID and information ID (Step 208).

After being encrypted by the encrypting circuit 16 and being converted into predetermined signals by the converter 17, the access authorizing information per recording medium such as the CD-ROM 42 is transmitted to the user terminal equipment 2 via the communication interface section 18 (Step 209). Thereby the user can access the information, so that the accounting information of the user is updated in response to the requested information ID and is stored again in the user management information in the storage device 12 (Step 210). The information offerer totals the accounting information and issues a bill to the user at a predetermined time (e.g. at the end of the month).

The access authorizing information transmitted to the user terminal equipment 2 is received via the communication interface section 36 and is sent to the cryptograph decoding circuit 35 to decode the cryptograph. The CPU 32 updates the access authorizing information (key) by storing the decoded access authorizing information per recording medium in the storage device 40 (Step 211).

Thereby, the CPU 32 directs the CD-ROM reader 31 to access the requested information within the CD-ROM 42 based on the updated access authorizing information (key) (Step 107). The accessed and read information is displayed on the display unit 39 via the displaying circuit 38. Thus the user can obtain the requested information.

Figure 6:
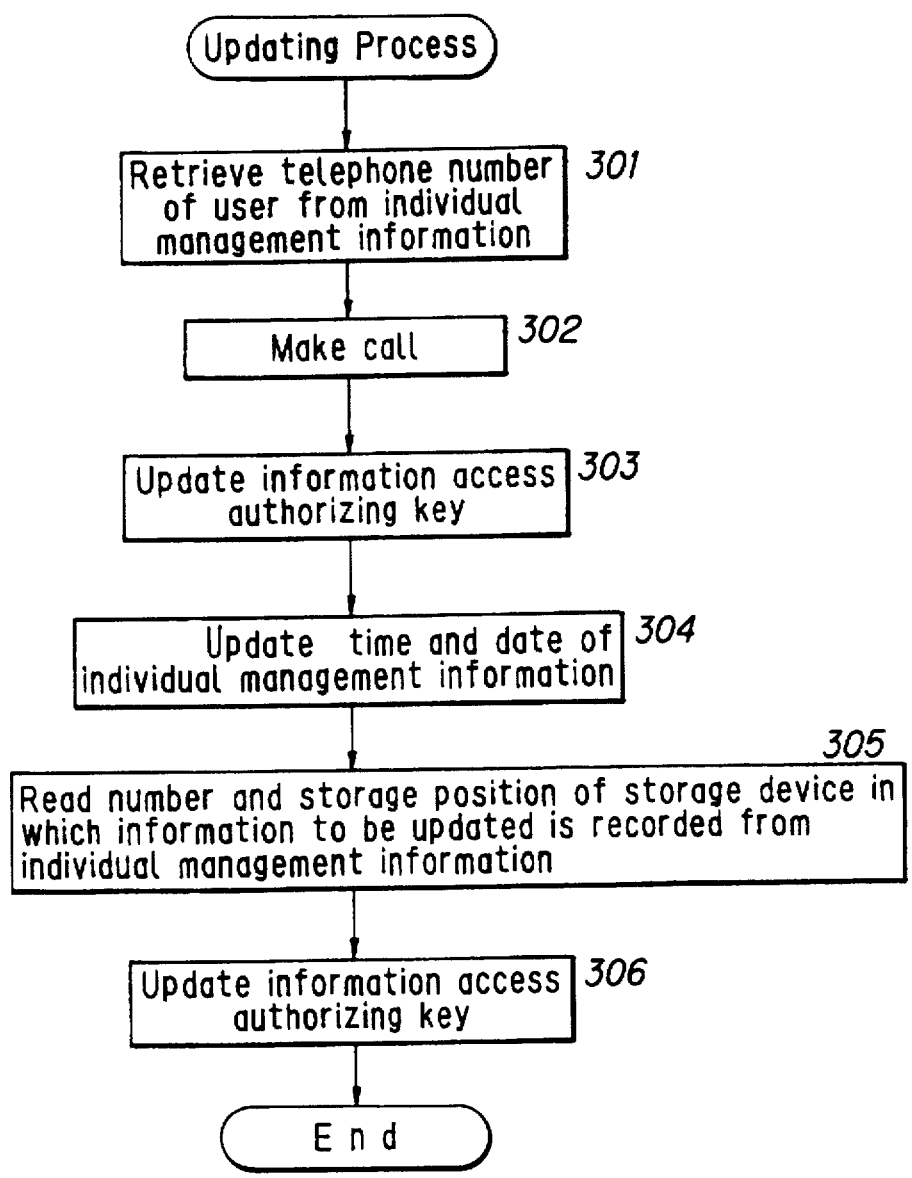
FIG. 6 is a flowchart explaining a process in updating information.

FIG. 6 shows a process executed when it is necessary for the information offering equipment 1 to update at least a part of the information access authorizing key stored in the storage device 40 of the user terminal equipment 2. This process is executed periodically per certain period of time or every time when it becomes necessary to update (when an effective period expires).

The CPU 13 in the information offering equipment 1 retrieves a user's telephone number from the management information stored in the storage device 11 (Step 301). Then a calling operation is made to the telephone number by the communication interface section 18 (Step 302). When the line is connected between the information offering equipment 1 and the user terminal equipment 2 as a result of the calling operation, information for updating the information access authorizing key is transmitted to the terminal 2 to update the information access authorizing key (Step 303). The information access authorizing key is thus updated, so that the CPU 13 updates update history information (update time and date) stored in the storage device 11 (Step 304).

The CPU 13 also reads the area and storage position in the storage device 40 of the user terminal equipment 2 in which the information access authorizing key to be updated is recorded from the individual management information stored in the storage device 12 (Step 305). Then, it transmits an update request and update information to the user terminal equipment 2 via the communication interface section 18 in order to update the information access authorizing key of the read number of the storage device and at the read storage position.

When the user terminal equipment 2 receives the update request from the information offering equipment 1, the CPU 32 executes a process which corresponds to the request. That is, it controls the storage device 40 of the supplied number to rewrite the information access authorizing key stored at the supplied storage position with the new transmitted information access authorizing key (Step 306).

The information offerer can limit the user who has not paid a fee which corresponds to accounting from using the information by not updating the information access authorizing key.

Note that when access authorizing information to all of the users is updated at once, a transmission efficiency may be improved by transmitting updated information by switching the communication interface section 18 to the broadcasting network 5; and when access authorizing information to an individual user is updated, a safety may be enhanced by transmitting updated information by switching the communication interface section 18 to the communication network 3.

Note also that although certain codes or the like may be used as the information access authorizing key, directory information may be transmitted as the information access authorizing key, that is, not recording it in the CD-ROM 42.

As described above, according to the information offering system of the present invention, the information recording medium is offered from the information offerer to the user and the user identifier is transmitted from the user to the information offerer by first information transmitting/ receiving means. When the user is determined to be a legitimate user from the user identifier, access authorizing information which authorizes the user to access and read information in the information recording medium is transmitted from the information offerer to the user by second information transmitting/receiving means. Accordingly, the present invention has an effect that information having an enormous amount of data such as images and sound may be provided to a large number of users efficiently at low cost.

While a preferred embodiment has been described, variations thereto will occur to those skilled in the art within the scope of the present inventive concepts which are delineated by the following claims.

What is claimed is:

1. An information offering system, comprising:
   a center for providing information; and
   a user terminal which receives the provided information from said center,
   said user terminal comprising:
      information storage means for storing chargeable information supplied from said center to said user terminal, said chargeable information including a plurality of various type information items;
      first transmitting means for transmitting a request signal for requesting said center to transmit access authorizing information for authorizing access to said chargeable information having been stored in said information storage means and for transmitting a user ID for identifying said user terminal, said first transmitting means transmitting to said center an information ID corresponding to one of said information items for identifying the corresponding chargeable information; and
      first control means for reading said chargeable information having been authorized to be read in response to said access authorizing information transmitted from said center,
   said center comprising:
      means for receiving said request signal and said user ID transmitted from said user terminal;
      determining means for determining whether said user ID is valid; and
      second transmitting means for transmitting said access authorizing information to said user terminal when said user ID is determined to be valid, said access authorizing information corresponding to each said information ID.

2. The information offering system according to claim 1, wherein said second transmitting means transmits said access authorizing information using a first communication method.

3. The information offering system according to claim 2, wherein said center further comprises third transmitting means for transmitting said chargeable information to a user by using a second communication method.

4. The information offering system according to claim 3, wherein said first communication method uses a communication network and said second communication method uses a broadcasting network, a communication rate of said communication network and broadcasting network being asymmetrical.

5. The information offering system according to claim 4, wherein said second transmitting means uses said broadcasting network to transmit said access authorizing information to a plurality of users, said second transmitting means using said communication network to transmit said access authorizing information individually.

6. The information offering system according to claim 1, wherein said information storage means is a CD-ROM distributed to a user in advance.

7. The information offering system according to claim 1, wherein said user terminal further comprises first access key storage means for storing said access authorizing information, and wherein said first control means reads said access authorizing information having been stored in said first access key storage means for accessing said chargeable information which corresponds to said information ID.

8. The information offering system according to claim 7, wherein said first control means generates said request signal when no access authorizing information which corresponds to said information ID exists in said first access key storage means.

9. The information offering system according to claim 7, wherein said center further comprises:

second access key storage means for storing said access authorizing information for each said information item in correspondence with each respective information ID; and second control means for reading from said second access key storage means said access authorizing information which corresponds to each said respective information ID.

10. The information offering system according to claim 7, wherein an effective period is selected for said access authorizing information stored in said first access key storage means, and said first control means inhibits access to said chargeable information when said effective period has expired.

11. The information offering system according to claim 10, wherein said first control means generates said request signal for requesting appropriate access authorizing information to be transmitted to said center when said effective period has expired.

12. The information offering system according to claim 1, wherein said center further comprises:

first accounting information storage means for storing first accounting information for each said information item in correspondence with each said information ID;

second accounting information storage means for storing second accounting information for each user in correspondence with a respective user ID;

accounting information updating means for updating each said second accounting information by reading the corresponding first accounting information when said access authorizing information is transmitted to said user terminal.

13. The information offering system according to claim 1, wherein said chargeable information contains contact information on how to contact an information offerer.

14. The information offering system according to claim 13, wherein said information storage means stores said contact information in correspondence with said chargeable information.

15. The information offering system according to claim 13, wherein said first transmitting means transmits said request signal, information ID and user ID to said information offerer.

* * * * *